(12) United States Patent
Wang et al.

(10) Patent No.: US 11,954,449 B2
(45) Date of Patent: Apr. 9, 2024

(54) METHOD FOR GENERATING CONVERSATION REPLY INFORMATION USING A SET OF HISTORICAL CONVERSATIONS, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Fan Wang, Beijing (CN); Siqi Bao, Beijing (CN); Xinxian Huang, Beijing (CN); Hua Wu, Beijing (CN); Jingzhou He, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 345 days.

(21) Appl. No.: 17/475,073

(22) Filed: Sep. 14, 2021

(65) Prior Publication Data

US 2021/0406480 A1     Dec. 30, 2021

(30) Foreign Application Priority Data

Dec. 24, 2020   (CN) .......................... 202011553157.9

(51) Int. Cl.
*G06F 40/40* (2020.01)
*G06F 16/33* (2019.01)
(Continued)

(52) U.S. Cl.
CPC .......... *G06F 40/40* (2020.01); *G06F 16/3329* (2019.01); *G06F 16/3344* (2019.01); *G06N 7/01* (2023.01); *G10L 15/22* (2013.01)

(58) Field of Classification Search
CPC .......... G06N 7/01; G06N 20/00; G06N 20/20
See application file for complete search history.

(56) References Cited

U.S. PATENT DOCUMENTS 10,418,032 B1 *   9/2019   Mohajer ............. G10L 15/1815
10,818,293 B1 * 10/2020   Orkin ..................... G06F 9/542
(Continued)

FOREIGN PATENT DOCUMENTS

EP         3244403 A    11/2017
JP      2006039120 A     2/2006
(Continued)

OTHER PUBLICATIONS

Japanese Office Action dated Nov. 29, 2022 as received in application No. 2021-154686.
(Continued)

*Primary Examiner* — Jesse S Pullias
(74) *Attorney, Agent, or Firm* — Maschoff Brennan

(57) ABSTRACT

The disclosure discloses a method for generating a conversation, an electronic device, and a storage medium. The detailed implementation includes: obtaining a current conversation and historical conversations of the current conversation; selecting multiple reference historical conversations from the historical conversations and adding the multiple reference historical conversations to a temporary conversation set; and generating reply information of the current conversation based on the current conversation and the temporary conversation set.

12 Claims, 4 Drawing Sheets

(51) Int. Cl.
　　　*G06F 16/332*　　(2019.01)
　　　*G06N 7/01*　　　(2023.01)
　　　*G10L 15/22*　　 (2006.01)

(56) References Cited

U.S. PATENT DOCUMENTS

| | | | | |
|---|---|---|---|---|
| 2006/0020473 | A1* | 1/2006 | Hiroe | G10L 13/027 |
| | | | | 704/275 |
| 2008/0167914 | A1* | 7/2008 | Ikeda | G06Q 10/06311 |
| | | | | 705/7.29 |
| 2010/0217592 | A1* | 8/2010 | Gupta | G06F 40/35 |
| | | | | 704/236 |
| 2016/0379106 | A1 | 12/2016 | Qi et al. | |
| 2018/0203852 | A1* | 7/2018 | Goyal | G06F 40/56 |
| 2020/0402507 | A1* | 12/2020 | Neelakantan | G06N 3/047 |
| 2021/0065705 | A1* | 3/2021 | Ham | G10L 15/02 |

FOREIGN PATENT DOCUMENTS

| | | | |
|---|---|---|---|
| JP | 2013205523 | A | 10/2013 |
| JP | 2015102957 | A | 6/2015 |
| JP | 2016071050 | A | 5/2016 |
| JP | 2017010517 | A | 1/2017 |
| JP | 2017203808 | A | 11/2017 |

OTHER PUBLICATIONS

Okui et al., "Evaluations for personalized chatbot based on LSTM" Nov. 29, 2022.

Tomoyuki et al., "Automatic generation of the conversational sentences taken into consideration" Nov. 29, 2022.

\* cited by examiner

METHOD FOR GENERATING CONVERSATION REPLY INFORMATION USING A SET OF HISTORICAL CONVERSATIONS, ELECTRONIC DEVICE, AND STORAGE MEDIUM

CROSS REFERENCE TO RELATED APPLICATION

This application is based on and claims priority to Chinese Patent Application No. 202011553157.9, filed on Dec. 24, 2020, the entire content of which is hereby incorporated by reference.

FIELD

The disclosure relates to a field of computer technologies and further to a field of speech technologies, deep learning technologies and artificial intelligence technologies, and more particularly relates to a method for generating a conversation, an electronic device, and a storage medium.

BACKGROUND

Presently, in a conversation system based on an end-to-end model, when processes a current conversation, the end-to-end model requires to code previous content of multiple rounds of conversations, and to decode reply information for the current conversation in combination with the current conversation. With the above solution, it is required to code all the previous content at one time, which has a long coding length and a large amount of calculation.

SUMMARY

The disclosure provides a method and an apparatus for generating a conversation, an electronic device, and a storage medium.

According to a first aspect of the disclosure, a method for generating a conversation is provided. The method includes; obtaining a current conversation and historical conversations of the current conversation; selecting a plurality of reference historical conversations from the historical conversations and adding the plurality of reference historical conversations to a temporary conversation set; and generating reply information of the current conversation based on the current conversation and the temporary conversation set.

According to a second aspect of the disclosure, an electronic device is provided. The electronic device includes: at least one processor and a memory. The memory is communicatively coupled to the at least one processor. The memory is configured to store instructions executable by the at least one processor. When the instructions are executed by the at least one processor, the at least one processor is configured to: obtain a current conversation and historical conversations of the current conversation; select a plurality of reference historical conversations from the historical conversations and adding the plurality of reference historical conversations to a temporary conversation set; and generate reply information of the current conversation based on the current conversation and the temporary conversation set.

According to a third aspect of the disclosure, a non-transitory computer readable storage medium having computer instructions stored thereon is provided. The computer instructions are configured to cause a computer to execute the above method for generating the conversation. The method includes: obtaining a current conversation and historical conversations of the current conversation; selecting a plurality of reference historical conversations from the historical conversations and adding the plurality of reference historical conversations to a temporary conversation set, and generating reply information of the current conversation based on the current conversation and the temporary conversation set.

It should be understood that, contents described in the Summary are not intended to identify key or important features of embodiments of the disclosure, nor is it intended to limit the scope of the disclosure. Other features of the disclosure will become apparent from the following description.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Description will be made below to a method and an apparatus for generating a conversation, an electronic device, and a storage medium according to embodiments of the disclosure with reference to accompanying drawings.

Figure 1:
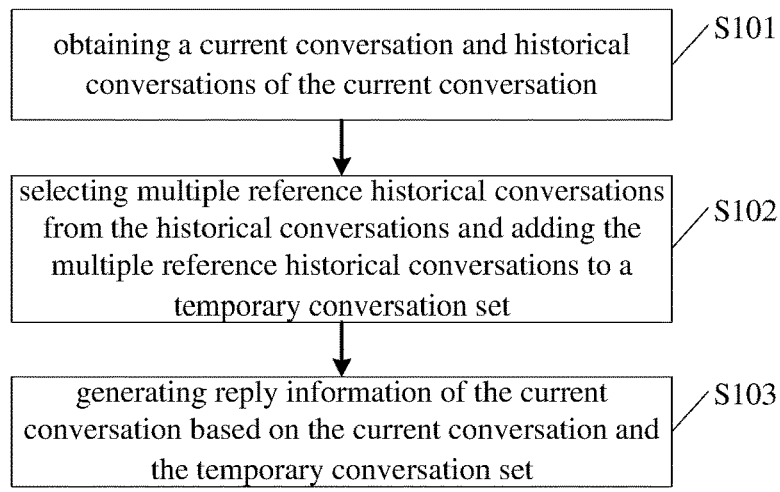
FIG. 1 is a flow chart of a method for generating a conversation according to a first embodiment of the disclosure.

FIG. 1 is a flow chart of a method for generating a conversation according to a first embodiment of the disclosure. It should be noted that, an executive subject of embodiments of the disclosure is an apparatus for generating a conversation. The apparatus may be a hardware device or software in the hardware device.

As illustrated in FIG. 1, a detailed implementation of the method for generating the conversation includes the following blocks.

At block 101, a current conversation and historical conversations of the current conversation are obtained.

In embodiments of the disclosure, the current conversation may be a conversation currently input when a user is talking with the apparatus for generating the conversation, such as a question raised by the user. A way for obtaining the current conversation by the apparatus for generating the conversation may include: obtaining a current speech of the user by performing speech collection in real time through the apparatus, or obtaining a current speech of the user through a speech collection equipment connected to the apparatus; and then taking the current speech as the current conversation, or taking a speech recognition result of the current speech as the current conversation.

In embodiments of the disclosure, the historical conversations of the current conversation refer to conversations collected and stored before a collection time point of the current conversation by the apparatus for generating the conversation.

At block 102, multiple reference historical conversations are selected from the historical conversations, and multiple reference historical conversations are added to a temporary conversation set.

In embodiments of the disclosure, a way for selecting the reference historical conversations by the apparatus for generating the conversation may be, such as, selecting randomly, or selection based on a collection time point of the historical conversations, or selecting based on a correlation between the historical conversations and the current conversation, or selecting based on the collection time point of the historical conversations and the correlation between the historical conversations and the current conversation. The selection manner may be determined based on an actual requirement.

In embodiments of the disclosure, the number of the reference historical conversations may be set based on a performance of the apparatus for generating the conversation, or based on a performance, an amount of calculation or a requirement of a model adopted by the apparatus for generating the conversation.

At block 103, reply information of the current conversation is generated based on the current conversation and the temporary conversation set.

In embodiments of the disclosure, a way for generating the reply information of the current conversation by the apparatus for generating the conversation may include inputting the current conversation and the temporary conversation set into a generation model to generate the reply information. The generation model may be, such as, a transformer model.

In conclusion, the current conversation and the historical conversations of the current conversation are obtained. Multiple reference historical conversations are selected from the historical conversations, and added to the temporary conversation set. The reply information of the current conversation is generated based on the current conversation and the temporary conversation set. In this way, processing on historical conversations to be processed may be reduced, coding lengths of the historical conversations may be reduced, and an amount of calculation and calculation duration may be reduced, such that the apparatus for generating the conversation may be applicable for a scene with relatively multiple rounds of conversations and have a good adaptability.

Figure 2:
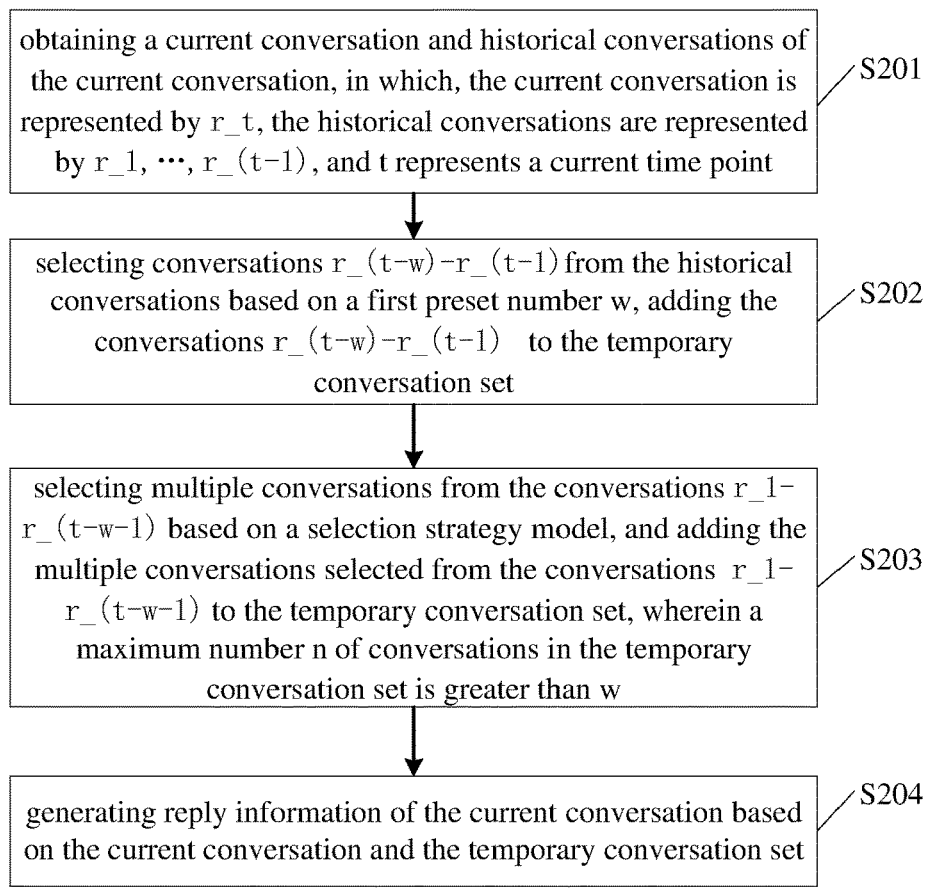
FIG. 2 is a flow chart of a method for generating a conversation according to a second embodiment of the disclosure.

FIG. 2 is a flow chart of a method for generating a conversation according to a second embodiment of the disclosure. It should be noted that, an executive subject of embodiments of the disclosure is an apparatus for generating a conversation. The apparatus may be a hardware device or software in the hardware device.

As illustrated in FIG. 2, a detailed implementation of the method for generating the conversation includes the following blocks.

At block 201, a current conversation and historical conversations of the current conversation are obtained. The current conversation is represented as $r_t$, the historical conversations are represented as $r_1, \ldots, r_{t-1}$, and t represents a current time point.

In embodiments of the disclosure, the current conversation may be a conversation currently input when a user is talking with the apparatus for generating the conversation, such as, a question raised by the user. The historical conversation may be a conversation input by the user before the collection time point of the current conversation; or, the conversation input by the user and a reply of the apparatus for generating a conversation to the conversation before the collection time point of the current conversation. The rounds of the historical conversations may be multiple rounds.

At block 202, conversations $r_{t-w}, \ldots, r_{t-1}$ are selected from the historical conversations based on a first preset number w, and added to a temporary conversation set.

In embodiments of the disclosure, the historical conversation having a smaller time difference with the current conversation generally has a greater correlation with the current conversation. Therefore, w conversations each having a smaller time difference with the current conversation may be directly added to the temporary conversation set, while, historical conversations each having a large time difference with the current conversation generally have a small correlation with the current conversation, so the historical conversations having the large time difference with the current conversation may be selectively added to the temporary conversation set.

In addition, all the historical conversations may be added to the temporary conversation set without making any selection in a case that a total number of the historical conversations is lower than or equal to w.

At block 203, multiple conversations are selected from the conversations $r_1, \ldots, r_{t-w-1}$ based on a selection strategy model, and added to the temporary conversation set. A maximum number n of conversations in the temporary conversation set is greater than w.

In embodiments of the disclosure, a way for selecting the multiple conversations from the conversations $r_1, \ldots, r_{t-w-1}$ by the apparatus for generating the conversation may be, such as, selecting randomly, or selecting based on a collection time point of the historical conversations, or selecting based on a correlation between the historical conversations and the current conversation, or selecting based on the collection time point of the historical conversations and the correlation between the historical conversations and the current conversation. The selection manner may be determined based on an actual requirement.

At block 204, reply information of the current conversation is generated based on the current conversation and the temporary conversation set.

In embodiments of the disclosure, a way for generating the reply information of the current conversation by the apparatus for generating the conversation may include inputting the current conversation and the temporary conversation set into a generation model to generate the reply information. The generation model may be, such as, a transformer model. Employing the generation model may further improve a generation efficiency of the reply information of the current conversation.

Figure 3:
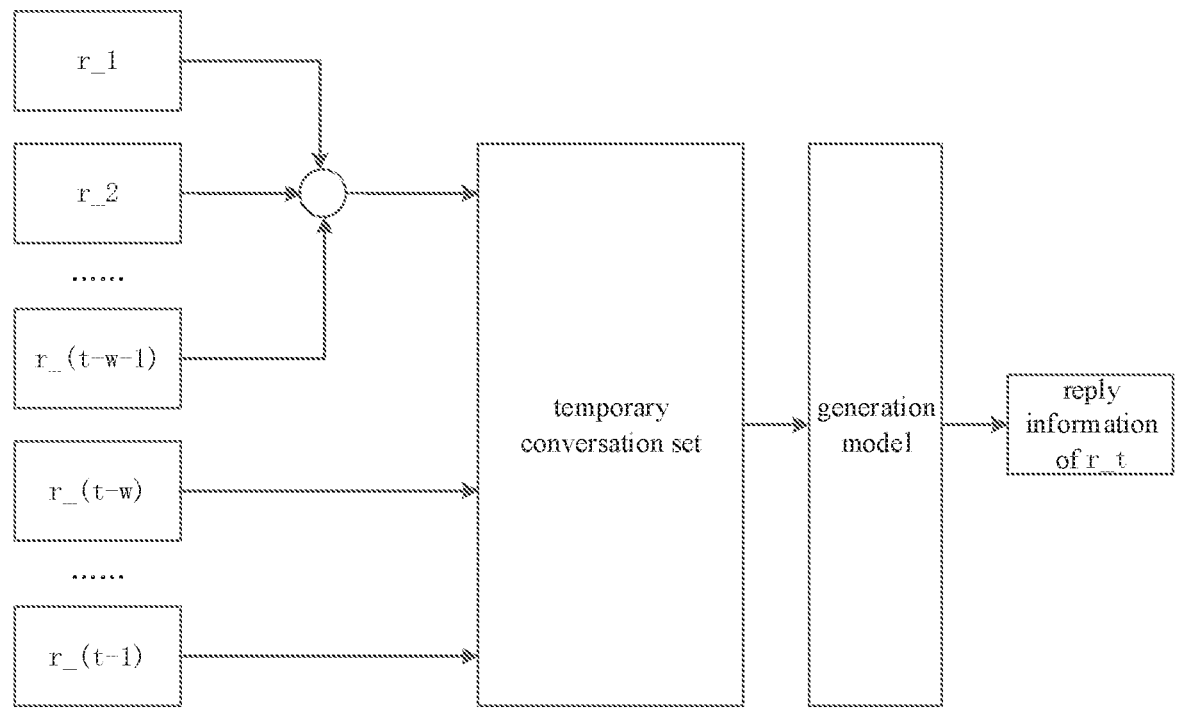
FIG. 3 is a block diagram illustrating generating reply information of a current conversation.

In embodiments of the disclosure, a schematic diagram of generating the reply information of the current conversation may be illustrated in FIG. 3. In FIG. 3, the conversations $r_{t-w}, \ldots, r_{t-1}$ are added to the temporary conversation set. Multiple conversations are selected from the conversations $r_1, \ldots, r_{t-w-1}$ based on the selection strategy model, and added to the temporary conversation set. Then, the reply information of the current conversation is generated based on the transformer model combining the temporary conversation set and the current conversation.

In conclusion, the current conversation and the historical conversations of the current conversation are obtained. The current conversation is represented as $r_t$, the historical conversations are represented as $r_1, \ldots, r_{t-1}$ and t represents the current time point. The conversations $r_{t-w}, \ldots, r_{t-1}$ are selected from the historical conversations based on the first preset number w, and added to the temporary conversation set. Multiple conversations are selected from the conversations $r_1, \ldots, r_{t-w-1}$ based on the selection strategy model, and added to the temporary conversation set, n is greater than w. The reply information of the current conversation is generated based on the current conversation and the temporary conversation set. In this way, accuracy of selecting the reference temporary conversations may be improved. The processing on historical conversations to be processed is reduced in a case of ensuring the generation efficiency of the reply information. The coding lengths of the historical conversations are reduced. The amount of calculation and the calculation duration may be reduced. Therefore, the apparatus for generating the conversation may be applicable for a scene with relatively multiple rounds of conversations and have a good adaptability.

Figure 4:
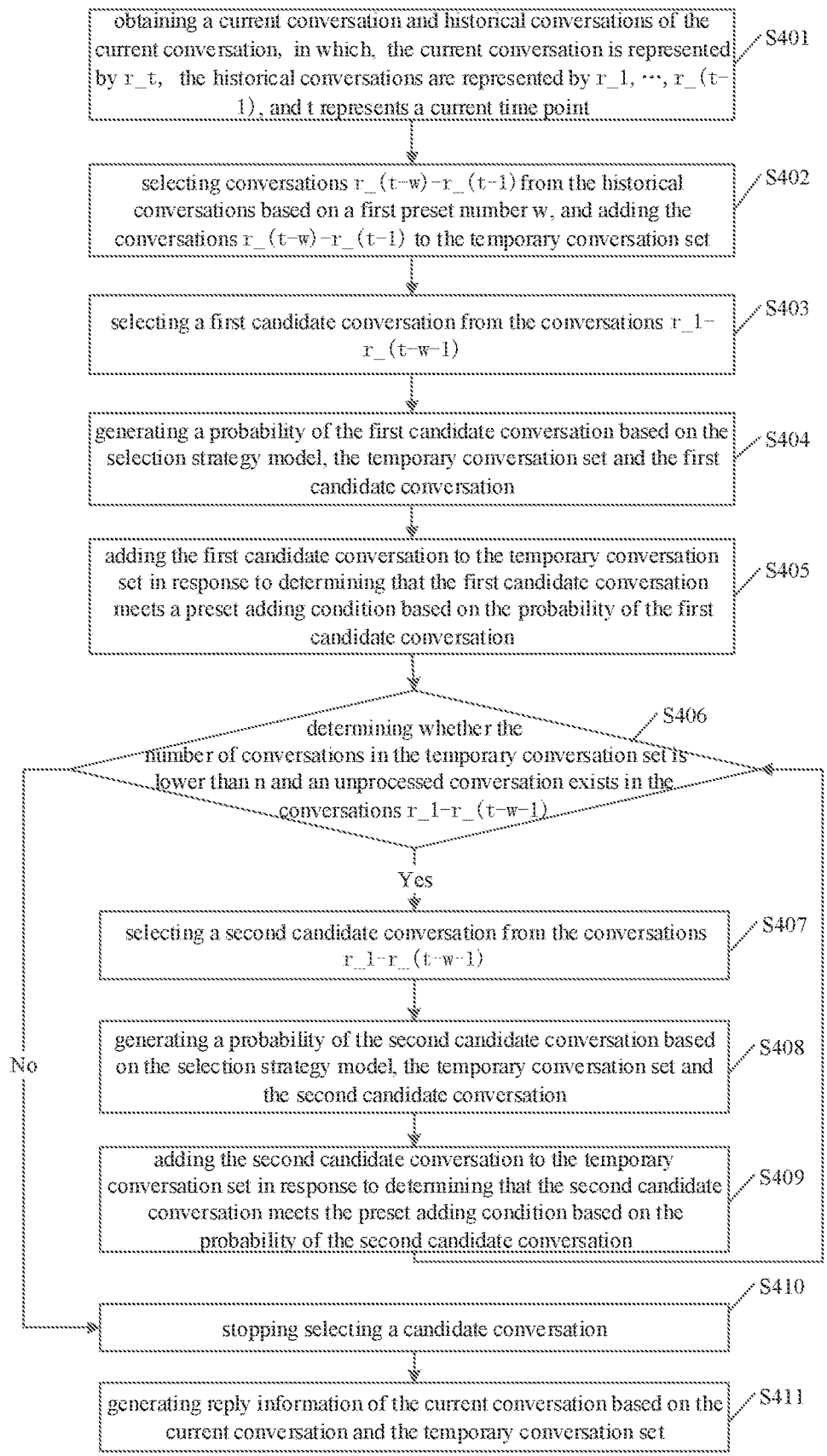
FIG. 4 is a flow chart of a method for generating a conversation according to a third embodiment of the disclosure.

FIG. 4 is a flow chart a method for generating the conversation according to a third embodiment of the disclosure. As illustrated in FIG. 4, a detailed implementation of the method for generating the conversation includes the following blocks.

At block 401, a current conversation and historical conversations of the current conversation are obtained. The current conversation is represented as $r_t$, the historical conversations are represented as $r_1, \ldots, r_{t-1}$, and t represents a current time point.

At block 402, conversations $r_{t-w}, \ldots, r_{t-1}$ are selected from the historical conversations based on a first preset number w, and added to a temporary conversation set.

The detailed description for the action at blocks 401-402 may be referred to embodiments illustrated in FIG. 1 or FIG. 2, which is not described in detail here.

At block 403, a first candidate conversation is selected from the conversations $r_1, \ldots, r_{t-w-1}$.

In embodiments of the disclosure, a way for selecting the first candidate conversation may be, such as, selecting randomly; selecting with starting from an earliest time point, such as starting from $r_1$; or, selecting with starting from a latest time point, such as starting from $r_{t-w-1}$. The first candidate conversation may an unprocessed conversation.

The first candidate conversation may represent one conversation, or represent multiple conversations. In a case that the first candidate conversation represents the multiple conversations, such as two conversations, two conversations may be selected from the conversations $r_1, \ldots, r_{t-w-1}$ at one time, such as $r_1$ and $r_2$. The number of the candidate conversations to be selected and a selection manner may be determined based on an actual requirement.

At block 404, a probability of the first candidate conversation is generated based on the selection strategy model, the temporary conversation set and the first candidate conversation.

In embodiments of the disclosure, the selection strategy model is configured to generate the probability of the first candidate conversation in combination with the temporary conversation set and the first candidate conversation. Calculation formulas of the selection strategy model may be illustrated as following formulas (1) to (3).

$$f(TM, r_\tau) = \sigma(\phi(r_\tau) \cdot \phi(TM)) \tag{1}$$

$$\phi(TM) = \Sigma_{r \in TM} \sigma(W_1 v(r) + b_1) \tag{2}$$

$$\phi(r_\tau) = \Sigma r \in TM \sigma(W_2 v(r_\tau) + b_2) \tag{3}$$

In the formulas (1) to (3), $r_\tau$ represents the first candidate conversation, where a value of $\tau$ ranges from t−w−1 to 0, f represents the selection strategy model, $f(TM, r_\tau)$ represents the probability of the first candidate conversation calculated by the selection strategy model, TM represents the temporary conversation set, $v(r_\tau)$ represents a vector corresponding to the first candidate conversation, and $W_1$, $W_2$, $b_1$, $b_2$ represent parameters of a f model.

A way for obtaining the vector corresponding to the first candidate conversation may include inputting the first candidate conversation into a coding part of the generation model and obtaining the vector corresponding to the first candidate conversation. The generation model is a model for generating the reply information of the current conversation.

At block 405, the first candidate conversation is added to the temporary conversation set in response to determining that the first candidate conversation meets a preset adding condition based on the probability of the first candidate conversation.

In embodiments of the disclosure, the preset adding condition may be, for example, that the probability of the first candidate conversation is greater than or equal to a preset probability threshold. The preset adding condition may also be, for example, sampling the first candidate conversation and other conversations among the conversations $r_1$-$r_{t-w-1}$ based on the probability of the first candidate conversation and determining that the first candidate conversation meets the preset adding condition in a case that the first candidate conversation is sampled, and determining that the first candidate conversation does not meet the preset adding condition in a case that the first candidate conversation is not sampled.

At block 406, it is determined whether the number of conversations in the temporary conversation set is lower than n and an unprocessed conversation exists in the conversations $r_1, \ldots, r_{t-w-1}$. When the number of conversations in the temporary conversation set is lower than n and the unprocessed conversation exists in the conversations $r_1, \ldots, r_{t-w-1}$, action at block 407 is executed; otherwise, when the number of conversations in the temporary conversation set is greater than or equal to n or any unprocessed conversation does not exist in the conversations $r_1, \ldots, r_{t-w-1}$, action at block 410 is executed.

Where n represents a maximum number of the conversations in the temporary conversation set.

At block 407, a second candidate conversation is selected from the conversations $r_1, \ldots, r_{t-w-1}$ in a case that the number of the conversations in the temporary conversation set is lower than n and an unprocessed conversation exists in the conversations $r_1, \ldots, r_{t-w-1}$.

The second candidate conversation may represent an unprocessed conversation.

At block 408, a probability of the second candidate conversation is generated based on the selection strategy model, the temporary conversation set and the second candidate conversation.

At block 409, the second candidate conversation is added to the temporary conversation set in response to determining that the second candidate conversation meets the preset adding condition based on the probability of the second candidate conversation. Then, action at block 406 is executed.

At block 410, selecting a candidate conversation is stopped in a case that the number of the conversations in the temporary conversation set is greater than or equal to n, or any unprocessed conversation does not exist in the conversations $r_1, \ldots, r_{t-w-1}$.

At block 411, reply information of the current conversation is generated based on the current conversation and the temporary conversation set.

In embodiments of the disclosure, a way for generating the reply information of the current conversation by the apparatus for generating the conversation may include inputting the current conversation and the temporary conversation set into the generation model to generate the reply information. The generated model may be, such as, a transformer model.

In embodiments of the disclosure, the selection strategy model and the generation model may be trained simultaneously, so as to reduce the training cost and improve the accuracy of the trained model. A training process of the generation model and the selection strategy model may include: obtaining multiple pieces of sample data including a sample conversation and sample history conversations; adding random disturbance distribution to the selection strategy model; inputting each sample data into the selection strategy model and the generation model respectively to obtain a prediction probability of the sample conversation outputted by the selection strategy model and reply information of the sample conversation outputted by the generation model; performing coefficient adjustment on the generation model based on the reply information of the sample conversation and a loss function of the generation model; and performing coefficient adjustment on the selection strategy model based on the loss function, the prediction probability of the sample conversation and an objective function of the selection strategy model.

The random disturbance distribution may be, such as, a normal distribution with an expectation value 0. A formula of the loss function of the generation model may be illustrated in the following formula (4). A formula of the objective function of the selection strategy model may be illustrated in the following formula (5).

$$NLL = -\mathbb{E} \Sigma_t \log G(r_t | TM) \qquad (4)$$

$$\mathcal{L}_{PG} = \mathbb{E} \Sigma_t NLL \log f(TM, r_t) \qquad (5)$$

In the formulas (4) and (5), NLL represents the loss function of the generation model, G represents the generation model, $G(r_t|TM)$ represents the reply information of the sample conversation output by the generation model, $f(TM, r_t)$ represents the prediction probability of the sample conversation; $\mathbb{E}$ represents an expectation value of the reply information of multiple sample conversations.

In conclusion, the current conversation and the historical conversations of the current conversation are obtained. The current conversation is represented as $r_t$, the historical conversations are represented as $r_1, \ldots, r_{t-1}$, and t represents the current time point. The conversations $r_{t-w}, \ldots, r_{t-1}$ are selected from the historical conversations based on the first preset number w, and added to the temporary conversation set. The first candidate conversation is selected from the conversations $r_1, \ldots, r_{t-w-1}$. The probability of the first candidate conversation is generated based on the selection strategy model, the temporary conversation set and the first candidate conversation. The first candidate conversation is added to the temporary conversation set in response to determining that the first candidate conversation meets the preset adding condition based on the probability of the first candidate conversation. The above action is executed repeatedly until the number of the conversations in the temporary conversation set is greater than or equal to n, or any unprocessed conversation does not exist in the conversations $r_1, \ldots r_{t-w-1}$. The reply information of the current conversation is generated based on the current conversation and the temporary conversation set. Therefore, multiple reference historical conversations may be selected from the historical conversations by employing the selection strategy model, and each selected reference historical conversation has a high probability. In this way, under a condition that the generation efficiency of the reply information is ensured, the coding lengths of the historical conversations may be reduced, the amount of calculation and the calculation duration may be reduced, such that the apparatus for generating the conversation may be applicable for a scene with relatively multiple rounds of conversations and have a good adaptability.

To achieve the above embodiments, the disclosure also provides an apparatus for generating a conversation.

Figure 5:
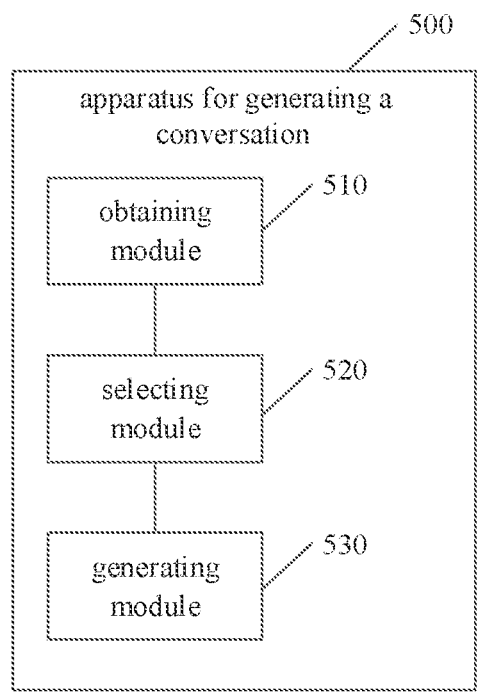
FIG. 5 is a block diagram of an apparatus for generating a conversation according to a fourth embodiment of the disclosure.

FIG. 5 is a block diagram according to a fourth embodiment of the disclosure. As illustrated in FIG. 5, the apparatus 500 for generating the conversation includes: an obtaining module 510, a selecting module 520, and a generating module 530.

The obtaining module 510 is configured to obtain a current conversation and historical conversations of the current conversation. The selecting module 520 is configured to select multiple reference historical conversations from the historical conversations, and to add the multiple reference historical conversations to a temporary conversation set. The generating module 530 is configured to generate reply information of the current conversation based on the current conversation and the temporary conversation set.

As a possible implementation of embodiments of the disclosure, the current conversation is represented by $r_t$, the historical conversations are represented by $r_1, \ldots, r_{t-1}$, t represents a current time point. The selecting module 520 includes: a first selecting unit and a second selecting unit. The first selecting unit is configured to select conversations $r_{t-w}, \ldots, r_{t-1}$ from the historical conversations based on a first preset number w, and to add the conversations $r_{t-w}, \ldots, r_{t-1}$ to the temporary conversation set. The second selecting unit is configured to select multiple conversations from the conversations $r_1, \ldots, r_{t-w-1}$ based on a selection strategy model, and to add the multiple conversations selected from the conversations $r_1, \ldots, r_{t-w-1}$ to the temporary conversation set. A maximum number n of conversations in the temporary conversation set is greater than w.

As a possible implementation of embodiments of the disclosure, the generating module 530 is configured to: input the current conversation and the temporary conversation set into a generation model to generate the reply information.

As a possible implementation of embodiments of the disclosure, the generation model and the selection strategy model are trained simultaneously.

As a possible implementation of embodiments of the disclosure, the second selecting unit is configured to: select a first candidate conversation from the conversations $r_1, \ldots, r_{t-w-1}$; generate a probability of the first candidate conversation based on the selection strategy model, the temporary conversation set and the first candidate conversation; and add the first candidate conversation to the temporary conversation set in response to determining that the first candidate conversation meets a preset adding condition based on the probability of the first candidate conversation.

As a possible implementation of embodiments of the disclosure, the second selecting unit is configured to: select a second candidate conversation from the conversations $r_1, \ldots, r_{t-w-1}$ in a case that the number of conversations in the temporary conversation set is lower than n and an unprocessed conversation exists in the conversations $r_1, \ldots, r_{t-w-1}$; generate a probability of the second candidate conversation based on the selection strategy model, the temporary conversation set and the second candidate conversation; and add the second candidate conversation to the temporary conversation set in response to determining that the second candidate conversation meets the preset adding condition based on the probability of the second candidate conversation.

As a possible implementation of embodiments of the disclosure, the second selecting unit is further configured to: stop selecting a candidate conversation in a case that the number of conversations in the temporary conversation set is greater than or equal to n, or any unprocessed conversation does not exist in the conversations $r_1, \ldots, r_{t-w-1}$.

As a possible implementation of embodiments of the disclosure, a training process of the generation model and the selection strategy model includes: obtaining multiple sample data, the sample data including a sample conversation and sample history conversations; adding random disturbance distribution to the selection strategy model; inputting each sample data into the selection strategy model and the generation model respectively to obtain a prediction probability of the sample conversation outputted by the selection strategy model and reply information of the sample conversation outputted by the generation model; performing coefficient adjustment on the generation model based on the reply information of the sample conversation and a loss function of the generation model; and performing coefficient adjustment on the selection strategy model based on the loss function, the prediction probability of the sample conversation and an target function of the selection strategy model.

According to embodiments of the disclosure, the disclosure also provides an electronic device and a readable storage medium.

Figure 6:
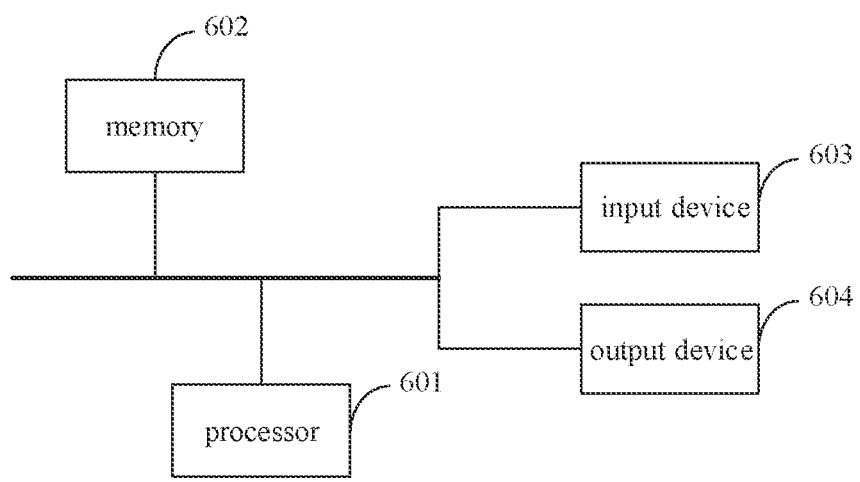
FIG. 6 is a block diagram illustrating an electronic device for implementing a method for generating a conversation according to embodiments of the disclosure.

FIG. 6 is a block diagram illustrating an electronic device for implementing a method for generating a conversation according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 6, the electronic device includes: one or more processors 601, a memory 602, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 6, a processor 601 is taken as an example.

The memory 602 is a non-transitory computer readable storage medium provided by the disclosure. The memory is configured to store instructions executable by at least one processor, to enable the at least one processor to execute the method for generating the conversation provided by the disclosure. The non-transitory computer readable storage medium provided by the disclosure is configured to store computer instructions. The computer instructions are configured to enable a computer to execute the method for generating the conversation provided by the disclosure.

As the non-transitory computer readable storage medium, the memory 602 may be configured to store non-transitory software programs, non-transitory computer executable programs and modules, such as program instructions/module (such as the obtaining module 510, the selecting module 520, and the generating module 530 illustrated in FIG. 5) corresponding to the method for generating the conversation according to embodiments of the disclosure. The processor 601 is configured to execute various functional applications and data processing of the server by operating non-transitory software programs, instructions and modules stored in the memory 602, that is, implements the method for generating the conversation according to the above method embodiments.

The memory 602 may include a storage program region and a storage data region. The storage program region may store an application required by an operating system and at least one function. The storage data region may store data created according to predicted usage of the electronic device capable of implementing the method for generating the conversation. In addition, the memory 602 may include a high-speed random access memory, and may also include a non-transitory memory, such as at least one disk memory device, a flash memory device, or other non-transitory solid-state memory device. In some embodiments, the memory 602 may optionally include memories remotely located to the processor 601, and these remote memories may be connected to the electronic device capable of implementing the method for generating the conversation via a network. Examples of the above network include, but are not limited to, an Internet, an intranet, a local area network, a mobile communication network and combinations thereof.

The electronic device capable of implementing the method for generating the conversation may also include: an input device 603 and an output device 604. The processor 601, the memory 602, the input device 603, and the output device 604 may be connected via a bus or in other means. In FIG. 6, the bus is taken as an example.

The input device 603 may receive inputted digital or character information, and generate key signal input related to user setting and function control of the electronic device capable of implementing the method for generating the conversation, such as a touch screen, a keypad, a mouse, a track pad, a touch pad, an indicator stick, one or more mouse buttons, a trackball, a joystick and other input device. The output device 604 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, moderationory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other. The server may be a cloud server, also known as a cloud computing server or a cloud host, which is a host product in a cloud computing service system, to solve difficult management and weak business scalability in conventional physical host and VPS (virtual private server) services.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the principle of the disclosure shall be included in the protection scope of disclosure.

What is claimed is:

1. A method for generating a conversation, comprising:
obtaining a current conversation and historical conversations of the current conversation;
selecting a plurality of reference historical conversations from the historical conversations and adding the plurality of reference historical conversations to a temporary conversation set; and
generating reply information of the current conversation based on the current conversation and the temporary conversation set;
wherein the current conversation is represented by $r_t$, the historical conversations are represented by $r_1, \ldots, r_{t-1}$, t represents a current time point, and selecting the plurality of reference historical conversations from the historical conversations and adding the plurality of reference historical conversations into the temporary conversation set comprise:
selecting conversations $r_{t-w}, \ldots, r_{t-1}$ from the historical conversations based on a first preset number w, and adding the conversations $r_{t-w}, \ldots, r_{t-1}$ to the temporary conversation set; and
selecting a plurality of conversations from the conversations $r_1, \ldots, r_{t-w-1}$ based on a selection strategy model, and adding the plurality of conversations selected from the conversations $r_1, \ldots, r_{t-w-1}$ to the temporary conversation set, wherein a maximum number n of conversations in the temporary conversation set is greater than w;
wherein generating the reply information of the current conversation based on the current conversation and the temporary conversation set comprises:
inputting the current conversation and the temporary conversation set into a generation model to generate the reply information;
wherein a training process of the generation model and the selection strategy model comprises:
obtaining a plurality of sample data, the sample data comprising a sample conversation and sample history conversations;

adding random disturbance distribution to the selection strategy model;
inputting each sample data into the selection strategy model and the generation model respectively to obtain a prediction probability of the sample conversation outputted by the selection strategy model and reply information of the sample conversation outputted by the generation model;
performing coefficient adjustment on the generation model based on the reply information of the sample conversation and a loss function of the generation model; and
performing coefficient adjustment on the selection strategy model based on the loss function, the prediction probability of the sample conversation and a target function of the selection strategy model.

2. The method of claim 1, wherein the generation model and the selection strategy model are trained simultaneously.

3. The method of claim 1, wherein selecting the plurality of conversations from the conversations $r_1, \ldots, r_{t-w-1}$ based on the selection strategy model and adding the plurality of conversations selected from the conversations $r_1, \ldots, r_{t-w-1}$ to the temporary conversation set comprise:
selecting a first candidate conversation from the conversations $r_1, \ldots, r_{t-w-1}$;
generating a probability of the first candidate conversation based on the selection strategy model, the temporary conversation set and the first candidate conversation; and
adding the first candidate conversation to the temporary conversation set in response to determining that the first candidate conversation meets a preset adding condition based on the probability of the first candidate conversation.

4. The method of claim 3, further comprising:
selecting a second candidate conversation from the conversations $r_1, \ldots, r_{t-w-1}$ in a case that the number of conversations in the temporary conversation set is lower than n and an unprocessed conversation exists in the conversations $r_1, \ldots, r_{t-w-1}$;
generating a probability of the second candidate conversation based on the selection strategy model, the temporary conversation set and the second candidate conversation; and
adding the second candidate conversation to the temporary conversation set in response to determining that the second candidate conversation meets the preset adding condition based on the probability of the second candidate conversation.

5. The method of claim 4, further comprising:
stopping selecting a candidate conversation in a case that the number of conversations in the temporary conversation set is greater than or equal to n, or any unprocessed conversation does not exist in the conversations $r_1, \ldots, r_{t-w-1}$.

6. An electronic device, comprising:
at least one processor; and
a memory, communicatively coupled to the at least one processor;
wherein the memory is configured to store instructions executable by the at least one processor, and when the instructions are executed by the at least one processor, the at least one processor is configured to:
obtain a current conversation and historical conversations of the current conversation;
select a plurality of reference historical conversations from the historical conversations and adding the plurality of reference historical conversations to a temporary conversation set; and
generate reply information of the current conversation based on the current conversation and the temporary conversation set;
wherein the current conversation is represented by $r_t$, the historical conversations are represented by $r_1, \ldots, r_{t-1}$, t represents a current time point, and the at least one processor is configured to:
select conversations $r_{t-w}, \ldots, r_{t-1}$ from the historical conversations based on a first preset number w, and to add the conversations $r_{t-w}, \ldots, r_{t-1}$ to the temporary conversation set; and
select a plurality of conversations from the conversations $r_1, \ldots, r_{t-w-1}$ based on a selection strategy model, and to add the plurality of conversations selected from the conversations $r_1, \ldots, r_{t-w-1}$ to the temporary conversation set, wherein a maximum number n of conversations in the temporary conversation set is greater than w;
wherein the at least one processor is configured to:
input the current conversation and the temporary conversation set into a generation model to generate the reply information;
wherein a training process of the at least one processor comprises:
obtaining a plurality of sample data, the sample data comprising a sample conversation and sample history conversations;
adding random disturbance distribution to the selection strategy model;
inputting each sample data into the selection strategy model and the generation model respectively to obtain a prediction probability of the sample conversation outputted by the selection strategy model and reply information of the sample conversation outputted by the generation model;
performing coefficient adjustment on the generation model based on the reply information of the sample conversation and a loss function of the generation model; and
performing coefficient adjustment on the selection strategy model based on the loss function, the prediction probability of the sample conversation and a target function of the selection strategy model.

7. The electronic device of claim 6, wherein the generation model and the selection strategy model are trained simultaneously.

8. The electronic device of claim 6, wherein the at least one processor is configured to:
select a first candidate conversation from the conversations $r_1, \ldots, r_{t-w-1}$;
generate a probability of the first candidate conversation based on the selection strategy model, the temporary conversation set and the first candidate conversation; and
add the first candidate conversation to the temporary conversation set in response to determining that the first candidate conversation meets a preset adding condition based on the probability of the first candidate conversation.

9. The electronic device of claim 8, wherein the at least one processor is configured to:
select a second candidate conversation from the conversations $r_1, \ldots, r_{t-w-1}$ in a case that the number of conversations in the temporary conversation set is lower than n and an unprocessed conversation exists in the conversations $r_1, \ldots, r_{t-w-1}$;

generate a probability of the second candidate conversation based on the selection strategy model, the temporary conversation set and the second candidate conversation; and add the second candidate conversation to the temporary conversation set in response to determining that the second candidate conversation meets the preset adding condition based on the probability of the second candidate conversation.

10. The electronic device of claim 9, wherein the at least one processor is configured to:

stop selecting a candidate conversation in a case that the number of conversations in the temporary conversation set is greater than or equal to n, or any unprocessed conversation does not exist in the conversations $r_1, \ldots, r_{t-w-1}$.

11. A non-transitory computer readable storage medium having computer instructions stored thereon, wherein the computer instructions are configured to cause a computer to execute a method for generating a conversation, and the method comprises:

obtaining a current conversation and historical conversations of the current conversation;

selecting a plurality of reference historical conversations from the historical conversations and adding the plurality of reference historical conversations to a temporary conversation set; and generating reply information of the current conversation based on the current conversation and the temporary conversation set;

wherein the current conversation is represented by $r_t$, the historical conversations are represented by $r_1, \ldots, r_{t-1}$, t represents a current time point, and selecting the plurality of reference historical conversations from the historical conversations and adding the plurality of reference historical conversations into the temporary conversation set comprise:

selecting conversations $r_{t-w}, \ldots, r_{t-1}$ from the historical conversations based on a first preset number w, and adding the conversations $r_{t-w}, \ldots, r_{t-1}$ to the temporary conversation set; and selecting a plurality of conversations from the conversations $r_1, \ldots, r_{t-w-1}$ based on a selection strategy model, and adding the plurality of conversations selected from the conversations $r_1, \ldots, r_{t-w-1}$ to the temporary conversation set, wherein a maximum number n of conversations in the temporary conversation set is greater than w;

wherein generating the reply information of the current conversation based on the current conversation and the temporary conversation set comprises:

inputting the current conversation and the temporary conversation set into a generation model to generate the reply information;

wherein a training process of the generation model and the selection strategy model comprises:

obtaining a plurality of sample data, the sample data comprising a sample conversation and sample history conversations;

adding random disturbance distribution to the selection strategy model;

inputting each sample data into the selection strategy model and the generation model respectively to obtain a prediction probability of the sample conversation outputted by the selection strategy model and reply information of the sample conversation outputted by the generation model;

performing coefficient adjustment on the generation model based on the reply information of the sample conversation and a loss function of the generation model; and performing coefficient adjustment on the selection strategy model based on the loss function, the prediction probability of the sample conversation and a target function of the selection strategy model.

12. The storage medium of claim 11, wherein selecting the plurality of conversations from the conversations $r_1, \ldots, r_{t-w-1}$ based on the selection strategy model and adding the plurality of conversations selected from the conversations $r_1, \ldots, r_{t-w-1}$ to the temporary conversation set comprise:

selecting a first candidate conversation from the conversations $r_1, \ldots, r_{t-w-1}$;

generating a probability of the first candidate conversation based on the selection strategy model, the temporary conversation set and the first candidate conversation; and adding the first candidate conversation to the temporary conversation set in response to determining that the first candidate conversation meets a preset adding condition based on the probability of the first candidate conversation.

* * * * *